(12) United States Patent
Hu

(10) Patent No.: US 9,708,505 B2
(45) Date of Patent: Jul. 18, 2017

(54) SURFACE COATED POLYESTER-BASED FIBROUS SUBSTRATE

(75) Inventor: Tengjiao Hu, Shanghai (CN)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 0 days.

(21) Appl. No.: 13/807,945

(22) PCT Filed: Jul. 13, 2011

(86) PCT No.: PCT/US2011/043806
§ 371 (c)(1),
(2), (4) Date: Jan. 2, 2013

(87) PCT Pub. No.: WO2012/009404
PCT Pub. Date: Jan. 19, 2012

(65) Prior Publication Data
US 2013/0108822 A1    May 2, 2013

(30) Foreign Application Priority Data

Jul. 14, 2010 (CN) .......................... 2010 1 0229883

(51) Int. Cl.
| | |
|---|---|
| *C09D 171/00* | (2006.01) |
| *D06M 15/53* | (2006.01) |
| *C08G 65/00* | (2006.01) |
| *D02G 3/02* | (2006.01) |
| *D02G 3/36* | (2006.01) |
| *D06N 3/00* | (2006.01) |
| *D06N 3/12* | (2006.01) |
| *D06M 101/32* | (2006.01) |

(52) U.S. Cl.
CPC ......... *C09D 171/00* (2013.01); *C08G 65/007* (2013.01); *D02G 3/02* (2013.01); *D02G 3/36* (2013.01); *D06M 15/53* (2013.01); *D06N 3/0036* (2013.01); *D06N 3/12* (2013.01); *C08G 2650/48* (2013.01); *D06M 2101/32* (2013.01); *Y10T 428/23986* (2015.04); *Y10T 428/2969* (2015.01); *Y10T 442/273* (2015.04)

(58) Field of Classification Search
USPC ..................... 428/96, 395; 427/222; 442/148
See application file for complete search history.

(56) References Cited

U.S. PATENT DOCUMENTS

| | | | |
|---|---|---|---|
| 4,065,259 A | 12/1977 | Jackson | |
| 4,356,291 A | 10/1982 | Darling | |
| 4,929,471 A | 5/1990 | Groelinger | |
| 5,747,392 A * | 5/1998 | Xiao .................... | D06N 3/0059 442/124 |
| 6,737,489 B2 | 5/2004 | Linert et al. | |
| 7,015,278 B2 * | 3/2006 | Trombetta et al. .......... | 524/591 |
| 7,803,894 B2 * | 9/2010 | Dams ................. | C08G 18/2835 525/452 |
| 2003/0195314 A1 | 10/2003 | Buckanin et al. | |
| 2005/0178996 A1 | 8/2005 | Huang et al. | |

FOREIGN PATENT DOCUMENTS

| | | |
|---|---|---|
| EP | 0670358 A1 | 9/1995 |
| JP | 4228113 B2 | 2/2009 |
| WO | 03044113 A1 | 5/2003 |
| WO | 2006050497 A1 | 5/2006 |
| WO | 2008063903 A1 | 5/2008 |

* cited by examiner

*Primary Examiner* — Lynda Salvatore

(57) ABSTRACT

This invention relates to polyester-based fibrous substrates being surface coated at least partially with a coating composition comprising perfluoropolyethers. Processes of application of the coating compositions are also provided. The polyester-based fibrous substrates after surface coating have improved wear and/or abrasion resistance relative to uncoated fibrous substrates.

7 Claims, No Drawings

SURFACE COATED POLYESTER-BASED FIBROUS SUBSTRATE

FIELD OF THE INVENTION

This invention relates to polyester-based fibrous substrates being surface coated at least partially with a composition comprising certain perfluoropolyethers, and processes to provide the same. The polyester-based fibrous substrates after surface coating have improved wear or abrasion resistance relative to the untreated fibrous substrates.

BACKGROUND OF THE INVENTION

Polyester is a class of polymers which contain the ester functional group in their main chain. Most commonly known polyesters are polyalkylene terephthalates include polyethylene terephthalate (PET), polytrimethylene terephthalate (PTT) and polybutylene terephthalate (PBT). Polyester fibers are known for properties such as high tenacity, low water absorption, resistant to mildew resistant, wrinkle resistant, and minimal shrinkage in comparison with other synthetic fibers. Major applications of polyester fibers include apparel, home furnishings such as carpets, curtains, draperies, wall coverings, and upholstery. Other applications of polyester fibers include hoses, conveyor belts, tire cords, and fiberfill as cushioning and insulating material in pillows, comforters and upholstery padding.

Applications of polyesters in industrial fabric, sportswear, rope, or carpet are constantly seeking methods to improve the wear or abrasion resistance of the polyesters. Methods to improve wear or abrasion resistance of polyester fiber include, for example, increasing the basic thickness of a fiber, altering the cross section shape of a fiber, or altering conditions during the spinning/drawing processes of the fiber. Alternatively, adding inorganic fillers with the polyester before melt spinning, is disclosed in JP4228113 wherein a woven fabric is made from PET yarns comprising 2% $TiO_2$ exhibiting a high tear strength.

However, there is also a need to provide methods to further improve wear or abrasion resistance of polyester-based fibrous substrates (such as fabrics, yarns, carpets) by simple surface treatment with suitable coating or spraying compositions.

Coating or spraying compositions comprising fluoropolymer onto a fibrous substrate to change the physical/chemical properties are taught. For example, US2003/0139521 (U.S. Pat. No. 6,737,498) discloses a fluorochemical composition for rendering a fibrous substrate oil and/or water repellent. U.S. Pat. No. 4,929,471 discloses the use of polymers based on vinyl ethers that have a perfluoroalkyl group for treating polyester fabric during its manufacturing process so as to produce a polyester fabric that has similar physical properties as found in silk or rayon.

It is thus desirable to find a suitable surface treatment composition for polyester-based fibrous substrates to improve the wear or abrasion resistance.

SUMMARY OF THE INVENTION

Provided is a coated substrate comprising a fibrous substrate comprising a polyester wherein the fibrous substrate is at least partially coated with a coating composition wherein the coating composition comprises a perfluoropolyether of Formula I:

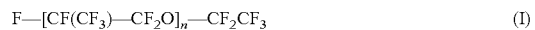

wherein n is an integer from 5 to 100.

Provided is a process for improving abrasion resistance of a fibrous substrate comprising a polyester comprising the steps of:
(i) applying to at least part of the surface of the fibrous substrate a coating composition comprising a perfluoropolyether of Formula I:

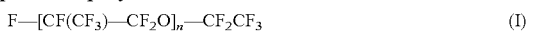

wherein n is an integer from 5 to 100;
(ii) drying the coated fibrous substrate; and
(iii) optionally rinsing the coated fibrous substrate from step (ii) with water; and drying the rinsed fibrous substrate.

DETAILED DESCRIPTION OF THE INVENTION

All publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this invention belongs. In case of conflict, the present specification, including definitions, will control.

Except where expressly noted, trademarks are shown in upper case.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

When the term "about" is used in describing a value or an end-point of a range, the disclosure should be understood to include the specific value or end-point referred to.

As used herein, the terms "comprises," "comprising," "includes," "including," "has," "having," "contains" or "containing," or any other variation thereof, are intended to cover a non-exclusive inclusion. For example, a composition, process, method, article, or apparatus that comprises a list of elements is not necessarily limited to only those elements but may include other elements not expressly listed or inherent to such composition, process, method, article, or apparatus. Further, unless expressly stated to the contrary, "or" refers to an inclusive "or" and not to an exclusive "or". For example, a condition A "or" B is satisfied by any one of the following: A is true (or present) and B is false (or not present), A is false (or not present) and B is true (or present), and both A and B are true (or present).

Also, the indefinite articles "a" and "an" preceding an element or component of the invention are intended to be nonrestrictive regarding the number of instances (i.e. occurrences) of the element or component. Therefore "a" or "an" should be read to include one or at least one, and the singular word form of the element or component also includes the plural unless the number is obviously meant to be singular.

The materials, methods, and examples herein are illustrative only and, except as specifically stated, are not intended to be limiting. Although methods and materials similar or equivalent to those described herein can be used in the practice or testing of the present invention, suitable methods and materials are described herein.

The invention is described in detail hereinunder.

Polyester-based Fibrous Substrate

Polyester polymers are well known to one skilled in the art and may include any condensation polymerization products derived from, by esterification or transesterification, an alcohol and a dicarboxylic acid including an ester thereof.

Alcohols include glycols having 2 to about 10 carbon atoms such as ethylene glycol, propylene glycol, butylene glycol, methoxypolyalkylene glycol, neopentyl glycol, trimethylene glycol, tetramethylene glycol, hexamethylene glycol, diethylene glycol, polyethylene glycol, cyclohexane dimethanol, or combinations of two or more thereof. Other suitable diols include ethylene glycol, 1,4-butanediol, 1,2-propanediol, diethylene glycol, triethylene glycol, 1,3-butanediol, 1,5-pentanediol, 1,6-hexanediol, 1,2-, 1,3- and 1,4-cyclohexane dimethanol, the longer chain diols and polyols made by the reaction product of diols or polyols with alkylene oxides, or combinations of two or more thereof.

Dicarboxylic acids include terephthalic acid, succinic acid, adipic acid, azelaic acid, sebacic acid, glutaric acid, isophthalic acid, 1,10-decanedicarboxylic acid, phthalic acid, dodecanedioic acid, the ester-forming equivalents (e.g., diesters such as dimethylterephthalate), or combinations of two or more thereof. Other diacids that are useful to form polyesters include isophthalic acid, 1,4-cyclohexane dicarboxylic acid, 1,3-cyclohexane dicarboxylic acid, succinic acid, glutaric acid, adipic acid, sebacic acid, 1,12-dodecane dioic acid, and the derivatives thereof such as the dimethyl-, diethyl-, dipropyl esters of these dicarboxylic acids, or combinations of two or more thereof.

Polyethylene terephthalate (PET) is a polyester prepared by the condensation polymerization of ethylene glycol and terephthalic acid (or dimethyl terephthalate). The PET may be a PET homopolymer or a copolymer that preferably contains 70 wt % or more of polyethylene terephthalate, or blends thereof. These may be modified with up to 30 wt % of polyesters made from other diols or diacids.

Polytrimethylene terephthalate (PTT) is a polyester that may be prepared by the condensation polymerization of 1,3-propanediol and terephthalic acid (or dimethyl terephthalate). The 1,3-propanediol for use in making the PTT is preferably obtained biochemically from a renewable source ("biologically-derived" 1,3-propanediol). The PTT may be a homopolymer or a copolymer that preferably contains 70 wt % or more of PTT, or blends thereof. These may be modified with up to 30 wt % of polyesters made from other diols or diacids. The most preferred resin is a PTT homopolymer.

Polybutylene terephthalate (PBT) is a polyester that may be prepared by the condensation polymerization of 1,4-butanediol and terephthalic acid (or dimethyl terephthalate). The PBT may be a homopolymer or a copolymer that preferably contains 70 wt % or more of PBT, or blends thereof. These may be modified with up to 30 wt % of polyesters made from other diols or diacids. The most preferred resin is PBT homopolymer.

Polyesters and processes for making them are well known to one skilled in the art.

In one embodiment, the fibrous substrate composed of a polyester, is selected from PET, PTT, PBT, and blends thereof. In another embodiment, the fibrous substrate is composed of a polyester, wherein the polyester is selected from a PTT homopolymer or a PTT copolymer which contains 70 wt % or more of PTT.

There is no specific limitation to the term "fibrous substrate." For the purposes of this invention the term "fibrous substrate" include fibers, yarns, fabrics, textile, or finished product, used in garments, home furnishings, carpets, and other consumer products. The fibrous substrate of the present invention may be "knitted", "woven" or "nonwoven" substrates. Non-woven substrates may include substrates which fibers are a web or batt of fibers bound by the application of heat, entanglement, and/or pressure. A particular preferred fibrous substrate of the invention is selected from fibers, fabrics, yarns, and carpets.

Coating Composition

High molecular weight polymers of hexafluoropropylene oxide, including the end-capped and chain-extended derivatives thereof, are useful, depending on the molecular weight and various physical characteristics, as high performance elastomers, dispersants or lubricants. It's unexpected to find that a surface treatment of a polyester-based fibrous substrate with a coating composition comprising a perfluoropolyether of Formula I provides surprisingly advantageous results in wear and/or abrasion resistance.

The coating composition of the present invention comprises a perfluoropolyether of Formula I:

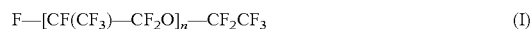

$$F\text{---}[CF(CF_3)\text{---}CF_2O]_n\text{---}CF_2CF_3 \qquad (I)$$

wherein n is an integer from 5 to 100.

Preferably the coating composition of the present invention comprises a perfluoropolyether of Formula I, wherein n is an integer from 10 to 60; more preferably, from 15 to 40.

Preferably the coating composition of the present invention comprises a perfluoropolyether of Formula I having a molecular weight in the range of 1000-16,000; more preferably, in the range of 1,800-10,000; most preferably, in the range of 2,600-7,000.

The coating composition of the present invention further comprises at least one solvent. Suitable solvents include (per)fluorinated solvents having a boiling point below 100° C. For example, perfluoropolyethers such as Galden® HT55 (bp 55° C.) Solvay Plastics; perfluoroalkanes such as perfluorooctane, perfluorohexane; hydrofluoroalkanes such as 2H, 3H-decafluoropentane (E. I. du Pont de Nemours and Company (Wilmington, Del., USA), Vertrel® XF, by 55° C.); (per)fluorocycloalkanes such as 1H,1H,2H-heptafluorocyclopentane (Zeorora®-H, bp 82.5° C.); hydrofluoroethers sold by 3M company under the tradename of Novec® including methoxynonafluorobutane (HFE-7100, by 61° C.), ethoxynonafluorobutane (HFE-7200, bp 76° C.), 2-trifluoromethyl-3-ethoxydecafluorohexane (HFE-7300, by 98° C.); hydrofluoropolyethers, for example, H-Galden® ZV60 (bp 60° C.). Preferred solvents include 2H,3H-decafluoropentane and methoxynonafluorobutane. In another embodiment the coating composition of the present invention may further comprise a thickener to achieve and maintain the desired viscosity, a fragrance, a dye; or mixtures of any two or more such components. The fragrances employed include natural and synthetic fragrances, perfumes, scents and essences and any other simple substances and mixtures of liquid or powdery compounds emitting fragrance. As the natural fragrances, there are presented fragrances of animal origin, such as musk, civet, castreum, ambergris or the like, and fragrances of vegetable origin, such as lemon oil, rose oil, citronella oil, sandalwood oil, peppermint oil, cinnamon oil or the like. Alternatively, as the synthetic fragrances, there are presented mixed fragrances of, for example, alpha-pinene, limonene, geraniol, linalool, lavandulol, nerolidol or the like.

The coating composition of the present invention can also contain other ingredients to provide the polyester-based fibrous substrate additional benefits, and/or improve performance and formulation.

The coating composition of the present invention may be applied to the fibrous substrate as a solution, a gel, a spray, or a foam.

Depending upon the application method of the coating composition, the amount (by % weight) of a perfluoropolyether of Formula I, or mixtures thereof present in the coating composition can vary typically from about 0.1% to about 50%, preferably from about 1% to about 40%, and more preferably from about 5% to about 20%, by the total weight of the coating composition.

The amount (by % weight) of solvent in the coating composition can vary from about 50% to about 99.9%, preferably from about 60% to about 99.0%, and more preferably from about 80% to about 95%, by the total weight of the coating composition.

The amount (by % weight) of a thickener in the coating composition can vary from 0% to about 10%, preferably from about 0.1% to about 5%, and more preferably from about 0.2% to about 1%, by the total weight of the coating composition.

The amount (by % weight) of a fragrance in the coating composition can vary from 0% to about 15%, preferably from about 0.1% to about 10%, and more preferably from about 0.2% to about 5%, by the total weight of the coating composition.

Some examples of particularly suitable perfluoropolyether of Formula I are commercially available and are selected from Krytox® GPL-104, Krytox® GPL-105 or Krytox® GPL-106 fluorinated oil (respectively having average molecular weights of approximately 3000, 4800 and 6000 respectively available from E. I. du Pont de Nemours and Company (Wilmington, Del., USA).

U.S. Pat. No. 4,356,291 (DuPont) discloses perfluoropolyethers terminating in a variety of end groups and methods of making same as is herein incorporated by reference.

The coating composition of the present invention may be in the form of a solution, gel, paste, spray, or foam. The coating composition of the present invention may be applied to the fibrous substrate (e.g., a fabric, yarn, a garment, a carpet, or other substance) via dipping, soaking, misting, or a spraying process, followed by a drying step.

The coating compositions of the present invention are preferably present as a clear liquid for use as a dipping solution or a spray, either of which is stable and maintains its liquid state without gelling under ambient conditions for extended periods of time.

Embodiments of General Compositions of a dipping solution and a spray formulation are found in Table 1 hereinbelow.

The coating compositions according to the present invention preferably have a viscosity in the range of about 0.3 cP to about 5 cP for spray compositions; and about 100 cP to about 450 cP in the form of liquid conditioner formulations. It is a particular advantage of the present invention that viscosities in this range can be achieved without the addition of viscosity control agents as found in the art.

TABLE 1

General Compositions

| Component | General Type | Weight % |
|---|---|---|
| Spray Formulation | | |
| Perfluoropolyether of Formula I | F—[CF(CF$_3$)—CF$_2$O]$_n$—CF$_2$CF$_3$ (n is an integer in the range of 5 to 100) | 0.1 to 20 |
| Solvent | fluorinated solvent of boiling point below 100° C. | balance |
| Fragrance (optional) | various | 0-2% |
| Dip Formulation | | |
| Perfluoropolyether of Formula (I) | F—[CF(CF$_3$)—CF$_2$O]$_n$—CF$_2$CF$_3$ (n is an integer in the range of 5 to 100) | 0.2 to 20 |
| Solvent | fluorinated solvent of boiling point below 100° C. | balance |
| Fragrance (optional) | various | 0-2% |

Process of Surface Treatment

The present invention further relates to a process for improving wear and/or abrasion resistance of a fibrous substrate composed of a polyester as described herein below.

The coating compositions of the present invention are applied to fibrous substrates by a variety of customary procedures. For application to washable apparel fabrics, the coating compositions are applied, for example, from an organic solution by brushing, dipping, spraying, padding, roll-coating, foaming or the like. They can be applied to dyed and undyed textile substrates. For carpet, the coating composition of the present invention is applied to one side of the carpet by dipping into a solution, or spraying with spray and/or foam applications.

The solution of the coating composition of the present invention can be diluted to fit a particular application method and/or apparatus. When the coating composition is surface coated on the fibrous substrate an effective amount of the coating composition is coated at least partially on the surface of the fibrous substrate to achieve the desired improvement of abrasion resistance. When the fibrous substrate is a fabric, yarn or textile, the coating composition of the present invention is preferably applied in a concentration from about 0.1 g/L to about 50 g/L, more preferably from about 0.5 g/L to about 25 g/L.

The dispersion or solution of the coating composition is typically applied to the fibrous substrate either by dipping the substrate into the solution of the coating composition for sufficient time (from a few seconds to minutes) to allow enough uptake of the coating composition, or by spraying the solution of the coating composition onto the surface of the fibrous substrate.

Once the surface of the fibrous substrate is at least partially coated with the coating composition, the substrate is dried at a temperature ranging from room temperature to about 60° C. In one embodiment for a large fibrous substrate such as a carpet, it is air dried at room temperature. After drying, the surface coated fibrous substrate is optionally rinsed with water, and dried in the same manner as previously described. Alternatively, the coating composition can be applied multiple times to improve abrasion resistance.

Further depending on the specific application method, the perfluoropolyether of Formula I may not coat only the surface of the fibrous substrate, it may penetrate into the fibrous substrate to various depths. In an embodiment it may be found throughout the fibrous substrate. In another embodiment it may be found at least partially on the surface and below the surface.

For coated fibrous substrates such as fabrics, textiles or carpets after drying, the amount of coating composition applied is an amount sufficient to provide about 0.1 to 50 wt % of the perfluoropolyether of Formula I relative to the total weight of the coated fibrous substrate; provided that the treatment without substantially affecting the look and feel of the fibrous substrate. More preferably, the coated fibrous substrates contain about 1 to 35 wt % of the perfluoropolyether of Formula I relative to the total weight of the coated fibrous substrates. Most preferably, the coated fibrous substrates contains about 5 to 20 wt % of the perfluoropolyether of Formula I relative to the total weight of the coated fibrous substrates.

Accordingly, one embodiment of the present invention relates to a process for improving abrasion resistance of a fibrous substrate composed of a polyester comprising the steps of:
(i) dipping at least part of the surface of the fibrous substrate into a coating composition comprising a perfluoropolyether of Formula I:

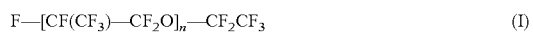

wherein n is an integer from 5 to 100;
(ii) drying the surface coated fibrous substrate; and
(iii) optionally rinsing the fibrous substrate from step (ii) with water; and drying the rinsed fibrous substrate.

According to another aspect, the present invention provides a process for improving abrasion resistance of a fibrous substrate composed of a polyester comprising the steps of:
(i) spraying at least part of the surface of the fibrous substrate with a coating composition comprising a perfluoropolyether of Formula I,

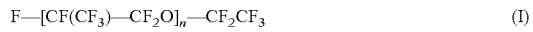

wherein n is an integer from 5 to 100;
(ii) drying the surface coated fibrous substrate; and
(iii) optionally rinsing the fibrous substrate from step (ii) with water; and drying the rinsed fibrous substrate.

Without further elaboration, it is believed that one skilled in the art using the preceding description can utilize the present invention to its fullest extent. The following Examples are, therefore, to be construed as merely illustrative, and not limiting of the disclosure in any way whatsoever. Percentages are by weight unless otherwise indicated.

The abbreviation "Ex." stands for "Example" and "Comp." stands for "Comparative" is followed by a number indicating in which example the compound is prepared.

EXAMPLES

Material

The polyester-based fibrous substrate in the examples was a fabric (plain weave) composed of PTT, also known as SORONA® and was available from E. I. du Pont de Nemours and Company (Wilmington, Del., USA).

The perfluoropolyether of Formula I used in the examples included Krytox® GPL104 (molecular weight about 3000), Krytox® GPL105 (molecular weight about 4800), and Krytox® GPL106 (molecular weight about 6000) obtained from E. I. du Pont de Nemours and Company (Wilmington, Del., USA).

The coating compositions were prepared as follows:
1) Coating solution A: diluting Krytox® GPL104 with 2H,3H-decafluoropentane (CAS No. 138495-42-8) to a 10 wt % solution.
2) Coating solution B: diluting Krytox® GPL105 with 2H,3H-decafluoropentane (CAS No. 138495-42-8) to a 10 wt % solution.
3) Coating solution C: diluting Krytox® GPL106 with HFE-7100, a mixture solvent of methoxynonafluorobutane and methoxynonafluoroisobutane (3M company Novec®) to a 10 wt % solution.

Test Sample Preparation

For Ex. 1-6: The fabric sample was cut into a strip of 10 cm wide and 10 cm long, and recorded the original weight (W0). The fabric sample was dipped into the coating composition for 30 second; dried at ambient temperature until constant weight; and recorded the weight (W1) of the surface treated fabric sample. The dried fabric sample was soaked in 1000 mL of water with gentle stirring for 1 hour. The fabric sample was picked up and laid flat to dry in a vacuum oven at ambient temperature until constant weight and recorded the final weight (W2).

For Ex. 7-12: The fabric sample was cut into a strip of 10 cm wide and 10 cm long, and recorded the original weight (W0). The fabric sample was sprayed with the coating composition to cover most of the surface; dried at ambient temperature until constant weight; and recorded the weight (W1) of the surface treated fabric sample. The dried fabric sample was soaked in 1000 mL of water with gentle stirring for 1 hour. The fabric sample was picked up and laid flat to dry in a vacuum oven at ambient temperature until constant weight and recorded the final weight (W2).

Comparative Sample Preparation

The comparison fabric sample was prepared in the same manner as the test sample, the fabric was either dipped in 1000 mL of water (for Comp. Ex. 1-3) or sprayed with water (for Comp. Ex. 4-5) without the presence of the perfluoropolyether of Formula I.

Abrasion Test & Results

A Taber abrasion test according to ASTM standard D3884-07 was used to evaluate the abrasion performance of fabric samples. The machine model was a Taber® 5131 Abraser with CS-10 abrasive wheel and the load was 1000 grams. The wheel speed was 60 cycles/min. After each abrasion test, the abrasion wheel was re-polished with polishing paper for 25 cycles. The abrasion resistance was evaluated by the number of abrasion cycles it took to cause one yarn breakage.

Table 2 listed the coating results on examples 1 to 6 and comparison examples 1 to 3 as well as their abrasion performance.

TABLE 2

Results of Dip Coating & Abrasion Performance

| Sample ID | Coating solution | W0 (g) | W1 (g) | W2 (g) | % of Uptake | No. Cycle to breakage |
|---|---|---|---|---|---|---|
| Ex. 1 | A | 2.7790 | 3.1472 | 3.1414 | 13.0 | >6000 |
| Ex. 2 | A | 2.6686 | 3.0009 | 2.9935 | 12.2 | >6000 |
| Ex. 3 | B | 2.8219 | 3.5516 | 3.5294 | 25.1 | >6000 |
| Ex. 4 | B | 2.4530 | 3.1784 | 3.1103 | 26.8 | >6000 |
| Ex. 5 | C | 2.2698 | 2.5602 | 2.5599 | 12.8 | 4889 |
| Ex. 6 | C | 2.4799 | 2.7241 | 2.7254 | 9.9 | 5165 |
| Comp. Ex. 1 | water | 2.7503 | 2.7526 | 2.7564 | 0.2 | 1928 |
| Comp. Ex. 2 | water | 2.7012 | 2.7006 | 2.7005 | 0.0 | 1935 |
| Comp. Ex. 3 | water | 2.7821 | 2.7812 | 2.7814 | 0.0 | 1962 |

Table 3 listed the coating results on examples 7 to 12 and comparison examples 4 to 5 as well as their abrasion performance.

TABLE 3

Results of Spray Coating & Abrasion Performance

| Sample ID | Coating solution | W0 (g) | W1 (g) | W2 (g) | % of Uptake | No. Cycle to breakage |
|---|---|---|---|---|---|---|
| Ex. 7 | A | 3.2513 | 4.0287 | 3.9668 | 22.0 | 5714 |
| Ex. 8 | A | 3.1402 | 4.2763 | 4.1432 | 31.9 | >6000 |
| Ex. 9 | B | 3.4099 | 4.9927 | 4.7899 | 40.5 | >6000 |
| Ex. 10 | B | 3.3021 | 4.8769 | 4.5849 | 38.9 | 5841 |
| Ex. 11 | C | 3.2762 | 4.2201 | 4.1964 | 28.1 | >6000 |
| Ex. 12 | C | 3.2268 | 4.0631 | 4.0241 | 24.7 | >6000 |
| Comp. Ex. 4 | water | 3.1752 | 3.1753 | 3.1786 | 0.1 | 2090 |
| Comp. Ex. 5 | water | 3.1661 | 3.1648 | 3.1672 | 0.0 | 2107 |

The data in Tables 2 and 3 demonstrated that surface treatment of a polyester-based fibrous substrate (i.e. a SORONA® fabric) with a coating composition comprising perfluoropolyether of Formula I yielded significant improvement in abrasion resistance as compared to the comparative examples 1 to 5.

What is claimed is:

1. A coated substrate comprising a fibrous substrate comprising a polyester wherein the fibrous substrate is at least partially coated with a coating composition in an amount sufficient to provide, after drying, 5 to 20 weight-%, of a perfluoropolyether of Formula I, based upon the total weight of the coated substrate:

F—[CF(CF3)-CF2O]n-CF2CF3     (I)

wherein n is an integer from 5 to 100, and
wherein the coating composition consists of the perfluoropolyether of Formula (I), at least one solvent, and optionally, at least one of a thickener, a fragrance, a dye or a combination of the thickener, fragrance or dye.

2. The coated substrate of claim 1 wherein the polyester is selected from polyethylene terephthalate, polytrimethylene terephthalate, polybutylene terephthalate or blends thereof.

3. The coated substrate of claim 1, wherein the polyester is a polytrimethylene terephthalate homopolymer or a polytrimethylene terephthalate copolymer which comprises at least 70 wt % of polytrimethylene terephthalate.

4. The coated substrate of claim 1 wherein the fibrous substrate is selected from fiber, fabric, yarn, or carpet.

5. A process for improving abrasion resistance of a fibrous substrate comprising a polyester comprising the steps of: (i) applying to at least part of the surface of the fibrous substrate a coating composition of a perfluoropolyether of Formula I:

F—[CF(CF3)-CF2O]n-CF2CF3     (I)

wherein n is an integer from 5 to 100, and wherein the coating composition consists of the perfluoropolyether of Formula (I), at least one solvent, and optionally, at least one of a thickener, a fragrance, a dye or a combination of the thickener, fragrance, or dye; (ii) drying the coated fibrous substrate; (iii) optionally rinsing the coated fibrous substrate from step (ii) with water; and drying the rinsed fibrous substrate.

6. The process for improving abrasion resistance of a fibrous substrate of claim 5 wherein applying is selected from brushing, dipping, spraying, padding, roll-coating or foaming.

7. A coated substrate comprising a fibrous substrate comprising a polyester wherein the fibrous substrate is at least partially coated with a coating composition in an amount sufficient to provide, after drying, 0.1 to 20 weight- %, of a perfluoropolyether of Formula I, based upon the total weight of the coated substrate:

F—[CF(CF3)-CF2O]n-CF2CF3     (I)

wherein n is an integer from 5 to 100, and
wherein the coating composition consists of the perfluoropolyether of Formula (I), at least one solvent, and optionally, a thickener, a fragrance, a dye or a combination of the thickener, fragrance or dye.

* * * * *